Aug. 23, 1960  H. L. McCOMBS, JR  2,949,781
SPEED RATIO MEASURING APPARATUS
Filed April 3, 1958  2 Sheets-Sheet 1

INVENTOR.
HOWARD L. McCOMBS, JR
BY Cecil J Arens
ATTORNEY

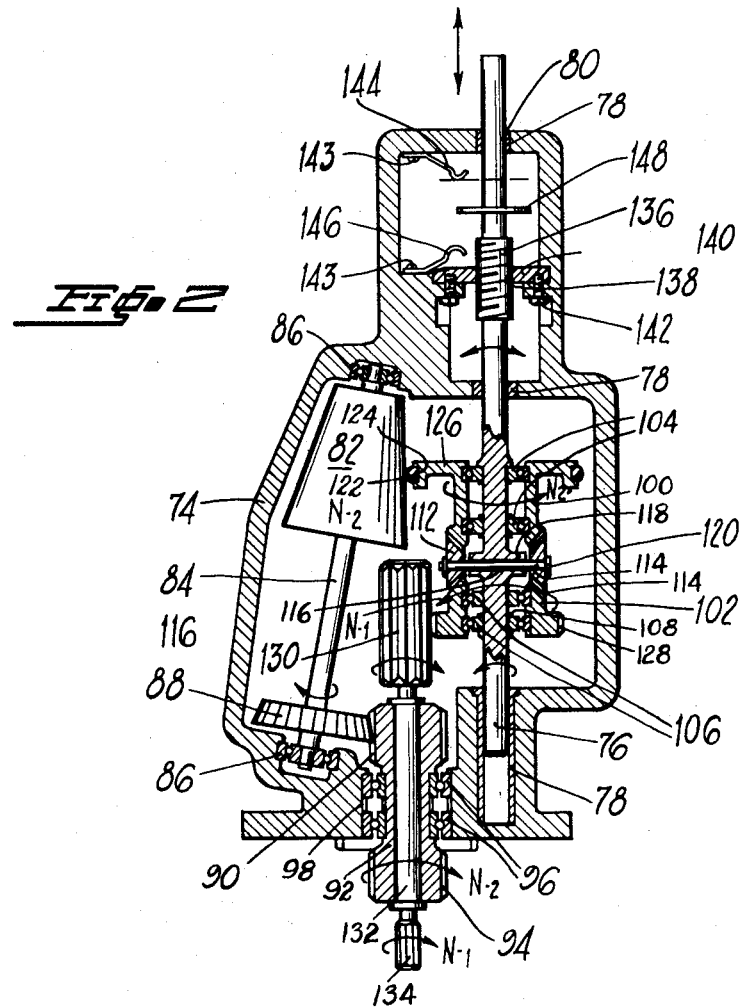

United States Patent Office 2,949,781
Patented Aug. 23, 1960

2,949,781

SPEED RATIO MEASURING APPARATUS

Howard L. McCombs, Jr., South Bend, Ind., assignor to The Bendix Corporation, a corporation of Delaware Filed Apr. 3, 1958, Ser. No. 726,203

2 Claims. (Cl. 73—507)

This invention relates to speed ratio measuring apparatus and more particularly to a device for measuring the speed ratio of one rotating member relative to another rotating member.

An object of this invention is to provide simple and reliable apparatus for measuring the ratio of speeds between two independent rotating members.

Another object of this invention is to provide speed ratio measuring apparatus which requires relatively few moving parts and which is small in size as well as light in weight.

A still further object of this invention is to provide rotatable apparatus responsive to the speeds of two independent rotating members and capable of providing an output signal which varies as a function of the ratio of two speeds and which is of sufficient strength to be used directly for control purposes without the need for any power other than that required to rotate said apparatus.

An important object of this invention is to provide speed ratio measuring apparatus which is easily calibrated.

Other objects and advantages will become apparent from the following detailed description taken in connection with the accompanying drawings wherein:

Figure 2 is a schematic representation of a modification of the present invention.

DESCRIPTION OF FIGURE 1

Figure 1:
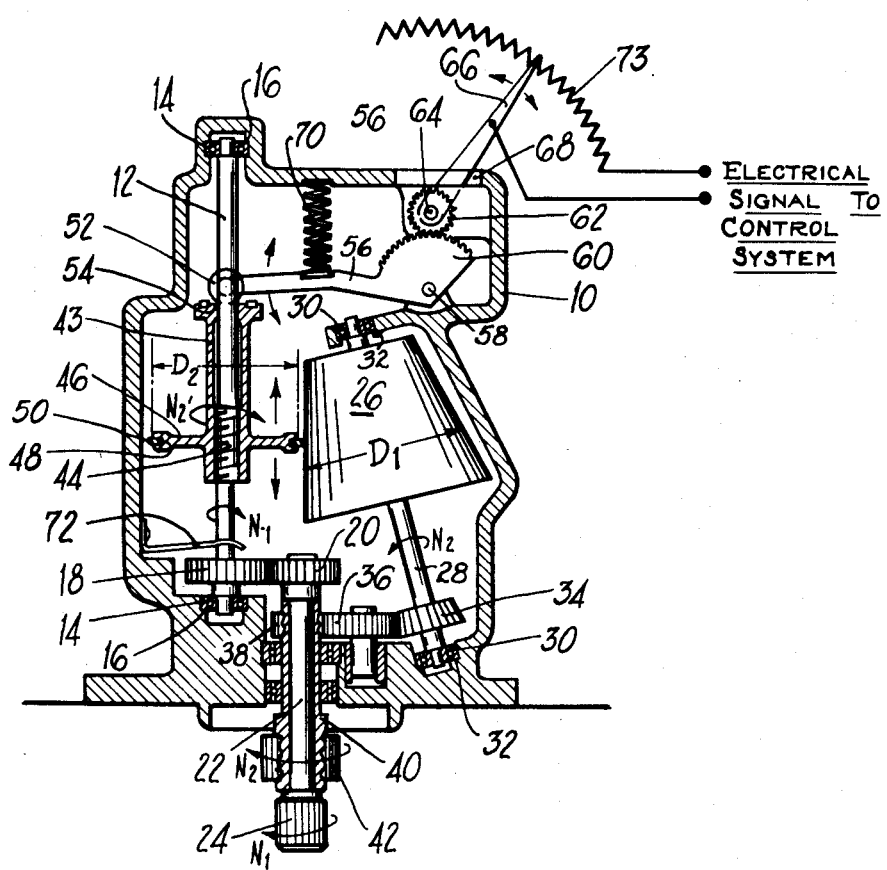
Figure 1 is a schematic representation of the present invention.

Referring to Figure 1, there is provided a casing 10 in which a threaded shaft 12 is rotatably mounted on suitable anti-friction bearings 14. The bearings 14 are supported in recesses 16 formed in casing 10. A spur gear 18 fixedly secured to one end of the shaft 12 is arranged to mesh with a spur gear 20 fixedly secured to a shaft 22 which in turn carries a gear 24 at the opposite end thereof. A frusto-conically shaped drum 26 having a variable diameter $D_1$ is fixedly secured to a shaft 28. The shaft 28 is rotatably mounted in suitable anti-friction bearings 30 which are supported in recesses 32 in casing 10. A spur gear 34 fixedly secured to shaft 28 is arranged to mesh with a spur gear 36 which in turn meshes with and is driven by a spur gear 38 fixedly secured to the end of a hollow shaft 40. A gear 42 is fixedly secured to the opposite end of the hollow shaft 40. The shaft 22 is shown concentric with and extending through hollow shaft 40 in a conventional concentric drive arrangement. A tubular member 43 is provided with a threaded portion 44 on its internal surface which engages the threaded portion of shaft 12. A flange 46 having a diameter $D_2$ extends radially outwardly from the tubular member 42 at a point midway between the ends of the threaded portion 44 and is provided with a peripheral recess 48 which carries a ring of resilient friction material 50. The ring of friction material 50 extends beyond the periphery of the flange into engagement with the surface of the cone-shaped drum 26.

A follower member 52 rests against a shoulder 54 formed on one end of the tubular member 42 and is rotatably mounted on a lever 56. The lever 56 is pivotally mounted on a pin 58 and is provided with a gear sector 60 which engages a pinion 62. The pinion 62 is mounted for rotation on a shaft 64 journalled in casing 10. An arm 66 fixedly secured to shaft 64 extends through an opening 68 in casing 10 and rotates with pinion 62. A spring 70 interposed between the lever 56 and casing 10 serves to urge the follower member 52 into contact with the shoulder 54.

The tubular member 43 is limited to a predetermined range of axial movement in accordance with the limitations imposed by the length of the working surface of the cone-shaped drum 26. To this end, the lengths of the threaded portions of the tubular member 43 and the shaft 12 are made equal and slightly less than one-half the length of the drum 26, such that if the ring 50 approaches either end of the cone, the threaded portion of the tubular member 43 will disengage the threaded portion of the shaft 12 and rotate freely. In one direction the tubular member 43 engages a leaf spring 72 one end of which is fixedly secured to casing 10, prior to the aforementioned disengagement. In the opposite direction, the tubular member is opposed by the force of spring 70 prior to the aforementioned disengagement. In each case the spring force is sufficient to cause re-engagement of the threaded portions of the shaft 12 and tubular member 43 when the speed ratio is within the range of operation of the device.

Operation of Figure 1

To illustrate one useful arrangement of the present invention, the following operational discussion will deal with a two-spool turbo-jet engine, not shown, with which the present invention may be used. The conventional two-spool turbo-jet engine is provided with two air compressors connected to separate turbines and rotated independently of one another. It is known that the speed ratio between the two compressors must be controlled in accordance with a predetermined schedule if optimum conditions of engine operation are to be attained. With this arrangement, the present invention is connected to the two compressors via a conventional gear and shafting arrangement, not shown, and is driven in accordance with the speeds $N_1$ and $N_2$ of the two compressors such that an output signal is produced which varies as a function of the $$\frac{N_1}{N_2}$$

speed ratio. This output signal may be utilized as a control signal to vary fuel flow to the engine or to actuate any other control apparatus which has a suitable effect on the operation of the engine.

The shaft 12 is rotated in one direction as a function of the speed $N_1$ of one compressor and the drum 26 is rotated in the opposite direction as a function of the speed $N_2$ of the other compressor.

The tubular member 43 is rotated by the drum 26 through frictional contact between the ring 50 and the surface of the drum. The speed at which the tubular member rotates is a function of the speed $N_2$, the variable diameter $D_1$ of the drum 26, and the fixed diameter $D_2$ of the flange 46. In the form of an equation, this relationship is set forth as $$N_2' = N_2\left(\frac{D_1}{D_2}\right)$$

where $N_2'$ is the speed of rotation of the tubular member 43.

As the shaft 12 and drum 26 rotate, it is apparent that the tubular member 43 will be motionless relative to the shaft 12 when the rotational speeds are equal i.e., when the $N_1=N_2'$. If the speed $N_1$ should increase causing the shaft 12 to rotate faster than the tubular member 43, the tubular member 43 would advance axially toward spring 72 and the rotational speed $N_2'$ would increase proportionally as the ratio of the diameters $$\frac{D_1}{D_2}$$

increases. The tubular member 43 would continue to move axially until the ratio of the diameters $$\frac{D_1}{D_2}$$

is such that the speed $N_2'$ of the tubular member 43 is equal to the speed $N_1$ of the shaft 12. The opposite would be true in the case of $N_1$ being less than $N_2'$. Thus, it is seen that any relative motion between the tubular member 43 and the shaft 12 whether it be a result of a change in the speed $N_1$ of one compressor or a change in the speed $N_2$ of the other compressor results in a corresponding movement of the tubular member 43. The follower member 52 and lever 56 respond to the movement of the tubular member 43 and through the gear sector 60 and pinion 62 cause the lever 66 to move in accordance with the existing speed ratio $$\frac{N_1}{N_2}$$

As mentioned heretofore, the position of the lever 66 may be used as an output signal for various control purposes depending upon the particular system in which it is to be incorporated. For instance, the lever 66 may be used as the movable arm of a potentiometer 73 which is connected to any suitable electrical control system, not shown. The resistance of the potentiometer 73 and the resulting signal supplied to the electrical control system will vary as a function of the $$\frac{N_1}{N_2}$$

speed ratio.

DESCRIPTION OF FIGURE 2

Referring to Figure 2, there is provided a casing 74 in which a shaft 76 is rotatably and axially mounted in sleeve bearings 78. One end of the shaft 76 extends through an opening 80 in the casing wall. A frusto-conically shaped drum 82 is fixedly secured to a shaft 84 mounted for rotation in bearings 86. A spur gear 88 fixedly secured to one end of the shaft 84 meshes with a gear 90 formed on one end of a hollow shaft 92. A gear 94 formed on the opposite end of the hollow shaft 92 extends outward from the casing 74. The hollow shaft 92 is mounted for rotation in bearings 96 suitably mounted in a recess 98 in casing 74. A pair of tubular members 100 and 102 are concentrically arranged with shaft 76 and are fixedly secured to the outer races of separate bearings 104 and 106, the inner races of which are mounted on the shaft 76 and locked in position thereon by any suitable means such as retaining rings 108. The tubular members 100 and 102 are spaced axially and are provided with gear teeth 110 formed on their opposing ends. The gear teeth 110 mesh with a pair of differential gears 112 which are mounted for rotation on opposite ends of a support rod 114. The rod 114 projects through a transverse bore 116 formed in the shaft 76 and diametrically opposed bosses 118. The differential gears 112 are spaced from the shaft 76 by the diametrically opposed bosses 118 and are held in position on rod 114 by any suitable means such as retaining rings 120. The tubular member 100 is rotated by the cone-shaped drum by means of a ring of resilient friction material 122 carried in a recess 124 formed in the peripheral edge of a flange 126 which extends radially outward from the tubular member 100. The tubular member 102 has an enlarged diameter portion upon which is formed a gear 128 which meshes with an elongated spur gear 130. The spur gear 130 is fixedly secured to one end of a shaft 132, the opposite end of which is provided with a pinion 134. The shaft 132 extends axially through the hollow shaft 92 in a conventional concentric drive arrangement.

The shaft 76 is provided with screw threads 136 which engage a threaded opening 138 in a partition 140 through which the shaft 76 extends. The partition 140 is fixedly secured to casing 74 by any suitable means such as screws 142. The shaft 76 is limited to a predetermined range of axial movement as it rotates relative to the partition 140 since upward or downward movement of the shaft ultimately results in disengagement of the screw threads 136 from the threaded opening 138. A pair of leaf springs 144 and 146 are oppositely disposed to a circular flange 148 fixedly secured to the shaft 76. Each of the leaf springs 144 and 146 is fixedly secured at one end to casing 74 by means of screws 143. As the shaft 76 moves axially the flange 148 engages one of the spring 144 or 146 depending upon its direction of movement in advance of disengagement of the screw threads 136 from the threaded opening 138 such that upon a reverse rotation of the shaft 76 the force of spring 144 or 146 will urge the screw threads 136 back into engagement with the threaded opening 138.

Operation of Figure 2

The gears 134 and 94 may be connected via a suitable arrangement of conventional gears and shafting, not shown, to two independent rotating compressors, not shown, and driven as a function of speeds $N_1$ and $N_2$, respectively, as in the case of Figure 1 heretofore described. The cone-shaped drum 82 and the tubular member 102 are rotated in the same direction as a function of speeds $N_2$ and $N_1$, respectively. The tubular member 100 is driven by the cone-shaped drum 82 at a speed $N_2'$ in accordance with the aforementioned relationship $$N_2' = N_2\left(\frac{D_1}{D_2}\right)$$

where $N_2$ is a rotational speed of the drum 82, $D_1$ is the variable diameter of the drum 82, and $D_2$ is the fixed diameter of the flange 126 and relative to the tubular member 102 rotates in the opposite direction. As long as the speed ratio between tubular members 100 and 102 remains constant the tubular members 100 and 102 will rotate at the same speed such that the differential gears 112 will rotate about the axis of the support rod 114 which in turn, under such conditions, will remain fixed in position in the plane of Figure 2. If the speed $N_1$ should increase or if the speed $N_2$ should decrease causing an increase in $$\frac{N_1}{N_2}$$

speed ratio the resulting change in speed ratio between the tubular members 100 and 102 would be transmitted through the differential gears 112 causing the support rod 114 and shaft 76 to rotate counterclockwise looking from the lower end of shaft 76. The shaft 76 then moves axially in a downward direction as a result of the engagement of screw threads 136 and threaded opening 138 whereupon the tubular members 100 and 102 are displaced a like amount. The speed $N_2'$ of the tubular member 100 increases proportionally as the ratio of diameters $$\frac{D_1}{D_2}$$

increases until the speed $N_2'$ is equal to the speed $N_1$ of the tubular member 102 whereupon the shaft 76 is stabilized rotationally.

If either of the speeds $N_1$ or $N_2$ should vary in an opposite sense from that described above such that the $$\frac{N_1}{N_2}$$

speed ratio decreases the shaft 76 will be rotated clockwise looking from the lower end of the shaft 76. The clockwise rotation results in upward movement of shaft 76 whereupon the tubular member 100 is driven at a slower speed in accordance with a ratio of diameters $$\frac{D_1}{D_2}$$

When the ratio of diameters is such that the speed $N_2'$ of the tubular member 100 is equal to the speed of the tubular member 102 the shaft 76 is stabilized in position.

Any suitable mechanism for controlling the operation of the engine may be connected to the end of the shaft 76 which extends outside of casing 74, the position of which is representative of the aforementioned $$\frac{N_1}{N_2}$$

speed ratio.

While only two embodiments of the present invention have been here shown and described, other embodiments of the present invention may be made in practice and many changes and modifications may be made within the scope of the appended claims without departing from the spirit of the invention.

I claim:
1. Speed responsive apparatus for computing the speed ratio between two independent rotating members comprising a shaft mounted for rotation about an axis, support means for said shaft, said shaft being threadedly engaged with said support means, conical means mounted for rotation about an axis and drivably connected to one of said rotating members, a tubular member rotatably mounted on said shaft and drivably connected to the tapered surface of said conical means, a tubular member rotatably mounted on said shaft and drivably connected to the other of said rotating members, a rod fixedly secured to said shaft, differential means rotatably mounted on said rod and operatively connected to said first and second named tubular members, said shaft being rotated as a function of the relative error between the rotational speeds of said first and second named tubular members such that said shaft rotates relative to said support means and moves axially in one direction or the other depending upon the relative error between said rotational speeds, said first named tubular member being displaced along said tapered surface to a position whereby the effective diameter of said conical means causes said first named tubular member to rotate at the same speed as said second named tubular member whereupon said shaft is stabilized in position, said axial movement of said shaft being representative of the speed ratio between said two independent rotating members.

2. Speed responsive apparatus for computing the speed ratio between two independent rotating members comprising a shaft mounted for rotation about an axis and provided with screw threads along a portion of its axial length, a fixed member having a threaded opening formed therein, said shaft being threadedly engaged with said fixed member, conical means mounted for rotation about an axis and drivably connected to one of said rotation members, a tubular member rotatably mounted on said shaft and drivably connected to the tapered surface of said conical means, a tubular member rotatably mounted on said shaft and drivably connected to the other of said rotating members, a support member fixedly secured to said shaft, differential means rotatably mounted on said support member and operatively connected to said first and second named tubular mmebers, said shaft being rotated as a function of the relative error between the rotational speeds of said first and second named tubular members whereupon said shaft is caused to advance axially through said opening in one direction or the other depending upon the relative error between said rotational speeds, and resilient means engageable with said shaft at limits of the axial travel thereof for urging said shaft into threaded engagement with said fixed member, said first named tubular member being displaced along said tapered surface to a position whereby the effective diameter of said conical means causes said first named tubular member to rotate at the same speed as said second tubular member whereupon said shaft is stabilized in position.

References Cited in the file of this patent
UNITED STATES PATENTS

| 502,557 | Doolittle | Aug. 1, 1893 |

FOREIGN PATENTS

| 1,045,904 | France | July 1, 1953 |
| 109,750 | Germany | Apr. 10, 1900 |

OTHER REFERENCES

Germany, application S31,857.1X420, Oct. 11, 1956.